April 15, 1969  F. M. IRVING, JR., ET AL  3,438,522
SILENCED BREAD PRODUCT DEPANNING SYSTEM
Filed Jan. 17, 1967  Sheet 1 of 2

INVENTORS
FRANK M. IRVING, JR.
ALBERT S. SCHMIDT

BY *Wynne + Finken*

ATTORNEYS

April 15, 1969  F. M. IRVING, JR., ET AL  3,438,522
SILENCED BREAD PRODUCT DEPANNING SYSTEM
Filed Jan. 17, 1967
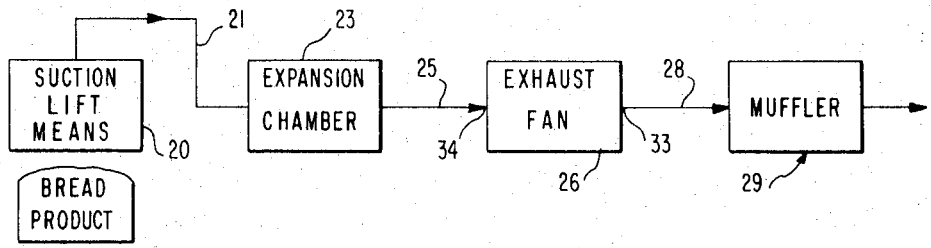
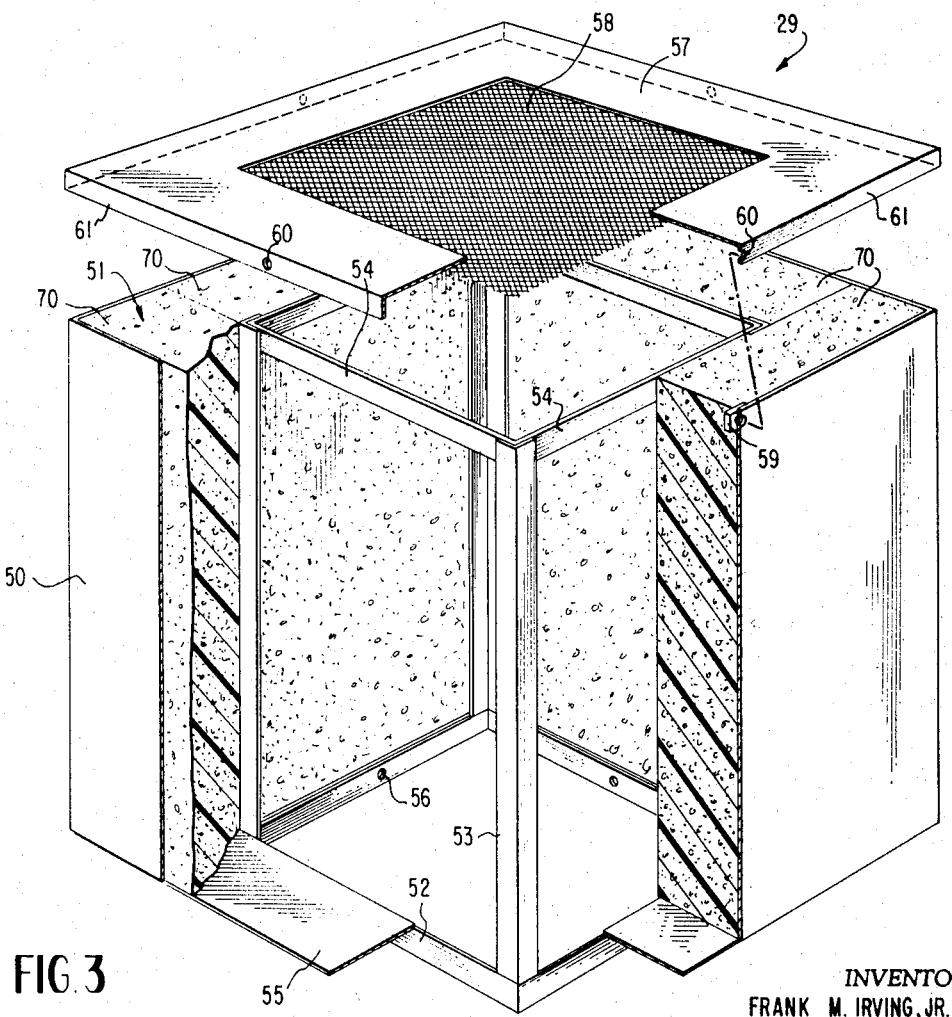
INVENTORS
FRANK M. IRVING, JR.
ALBERT S. SCHMIDT
BY Wynne + Finken
ATTORNEYS

United States Patent Office 3,438,522
Patented Apr. 15, 1969

3,438,522
SILENCED BREAD PRODUCT DEPANNING SYSTEM
Frank M. Irving, Jr., York, and Albert S. Schmidt, Wormleysburg, Pa., assignors to Alto Company, York, Pa., a partnership
Filed Jan. 17, 1967, Ser. No. 609,911
Int. Cl. B65g 65/34; F01n 1/24; B65b 69/00
U.S. Cl. 214—309                          1 Claim

ABSTRACT OF THE DISCLOSURE

A muffled suction system for lifting rolls with the removal of solid particles such as seeds prior to suction air flow through the fan and with a sound muffler beyond the fan exhaust which has its side walls lined with a polyfoam material and which has a protective screen cover at its discharge end.

---

This invention relates to a bread product vacuum depanning system which significantly reduces the intensity of sound energy resulting from the flow of a gaseous fluid medium through confining ducts. Actual tests and commercial use of the apparatus combination of the instant invention have established the high effectiveness of the system. An air stream is produced by an exhaust fan to lift bakery products from their pans and this stream upon being discharged from the fan flows within a sound muffling conduit having an inner face substantially entirely formed of a non-metallic sound reducing material, such as a homogeneous polyfoam material. Following this, the stream is exhausted to the atmosphere.

In modern day bakeries, the many automated advances have produced a sound problem. Since an extremely high degree of cleanliness is required for bakery machinery, the design of silent automated equipment has presented a particularly critical problem. The combination of the instant invention meets these requirements by the provision of a relatively inexpensive vacuum system utilizing as one component, a sound muffler of non-metallic material in the flow path.

These and further objects and advantages of the present invention will become more apparent upon reference to the following specification, appended claims and drawings wherein:

FIGURE 2 is a flow diagram of the silenced vacuum depanning system; and

FIGURE 3 is a perspective view of the muffler with parts cut-away for clarity.

Figure 1:
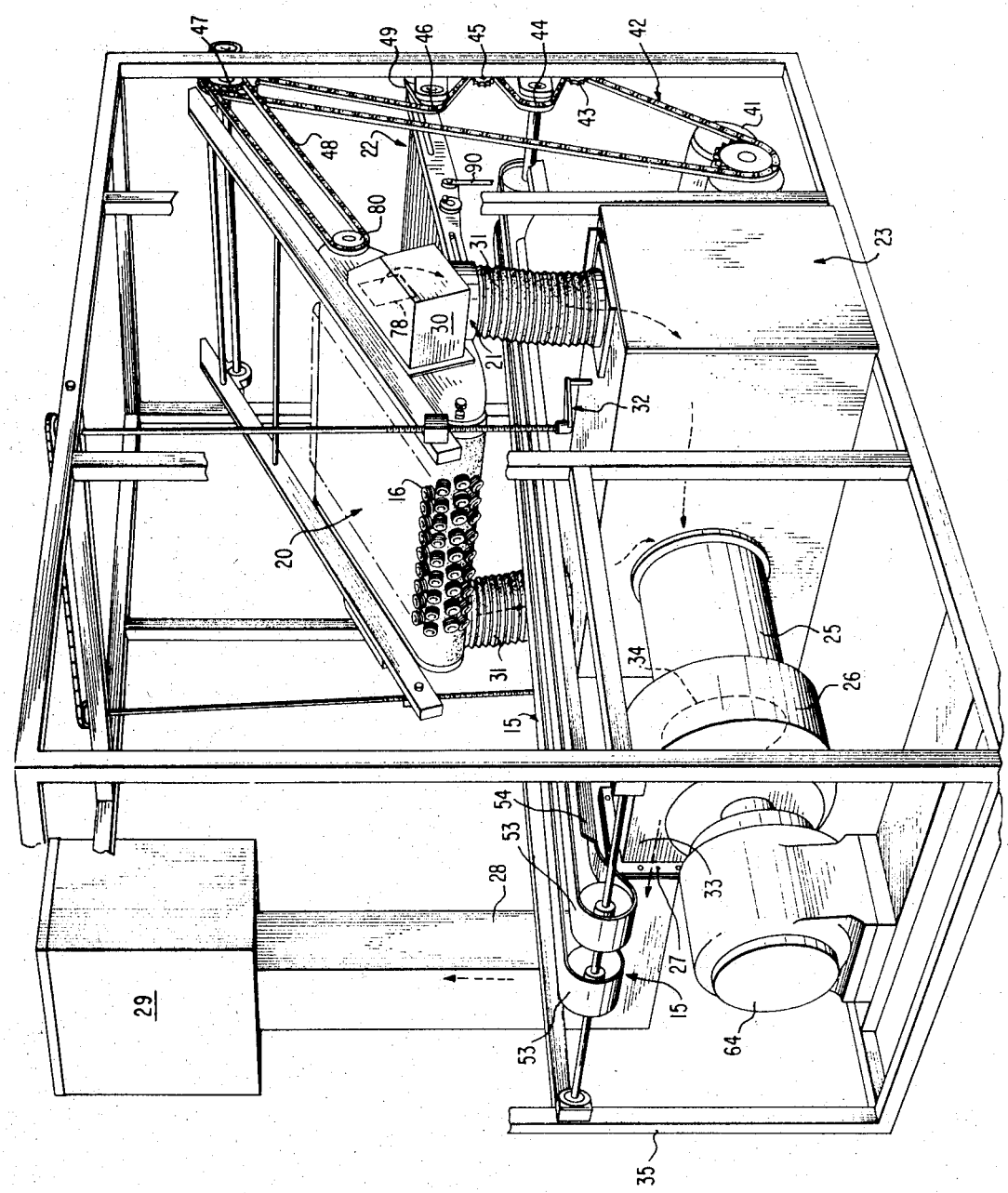
FIGURE 1 is a schematic view of the apparatus with the vacuum belt adjusted for depanning bread and with the upstream end of the panned product conveyor cutaway to show more fully the exhaust fan and its downstream duct means.

Referring now to FIGURESS 1 and 2, it will be seen that the moving means or feed conveyor 15 carries the panned products to the suction means or pickup conveyor 20 which has a plurality of product engaging and lifting suction cups 16. The pickup conveyor 20 has a convex upwardly inclined lower flight designed to smoothly engage the fragile bakery product with a very slightly downward and substantially horizontal movement followed by the arcuate upward lifting of the product into dropping alignment with a discharge conveyor 22. The pans (not shown) travel horizontally beneath the discharge conveyor 22. The depanned bakery products and their pans may then be transferred to further conveyor systems for further handling.

The suction means 20 provides an effective suction zone of predetermined longitudinal length along the lower flight of pickup conveyor 20. The upstream duct means indicated generally by numeral 21 includes in series at each transverse end of the conveyor or suction means 20, the side adapter chamber 30 and the flexible tube 31, each tube 31 exhausting into its respective top end portion of the expansion type solids separator 23. The upstream duct means 21 also includes the pipe 25 which connects to the center inlet 34 of the exhaust fan 26. The outlet 33 of the exhaust fan 26 connects through flange 27 to the downstream duct means indicated generally by numeral 28 and including the sound muffler 29.

Because of space limitations and particularly to aid in reducing the sound level, the sound muffler 29 is mounted at the top level of the apparatus as shown.

Preferably, suitable adjusting means 32 and 90 are provided for adjusting the vertical orientation of the three conveyors, namely the feed conveyor 15, the pickup conveyor 20, and the product discharge conveyor 22. By proper adjustment, products of different heights can be accommodated. Preferably, the feed conveyor 15 is mounted in a fixed horizontal position on a framework 35 and the pickup conveyor 20 and discharge conveyor 22 are pivotally mounted downstream of the lifting zone for arcuate movement of their upstream portions. Vertical link 90 indicates an adjusting means for swinging the discharge conveyor 22 about its pivotal mounting means.

The general arrangement for the drive system for the three conveyors is shown in FIGURE 1 as including a single power means 41, a chain means 42 which passes over idler 43 to the feed conveyor sprocket 44, over idler 45 to the discharge conveyor sprocket 46, and then to the pickup conveyor sprocket 47. The pickup conveyor drive has pickup drive line 48 extending from the sprocket 47 to the drive sprocket 80.

The exhaust fan 26 is powered directly by its motor 64.

When the apparatus is used to transfer bakery products, solid material enters the vacuum system. Such solid material may be in the form of bread crust, seeds, chunks of damaged bakery products and the like. To protect the exhaust fan 26 from an accumulation of such foreign matter, an efficient, appropriate solid particle separator 23 is placed in the upstream duct means 21. Such a separator, as is well known in the art, can be of the type referred to in the potato processing apparatus of the William T. Pfister U. S. Patent No. 2,812,061 of 1957. Other suitable devices are, of course, available such as the wheat and grain separator for protecting an exhaust fan of the James L. Wall U.S. Patents Nos. 2,265,707 of 1941; 2,464,648 of 1949; 1,825,274 of 1931; and 1,600,762 of 1926.

Preferably, the sound muffler 29 of the instant apparatus combination involves a rectangular structure as specifically shown in FIGURE 3.

The muffler includes an outer housing 50 with an inner lining 51 which defines an inline flow path therethrough. The flow path is substantially completely defined by an inner lining material of a non-metallic type and preferably of a homogeneous polyfoam material capable of reducing sound. Numerous materials such as fiber glass, rock wool, packed felt, and the like have been previously used; however, in the bakery machinery field the preferred polyfoam material meets the sanitary requirements most satisfactorily and effectively reduces sound. The inlet to the muffler includes a central rectangular inlet flange 52. Corner posts 53 extend upstream from the corners of the inlet flange 52 and are rigidly connected thereto. An outlet flange 54 rigidifies the posts 53 at their outlet ends. The outer housing 50 is connected to the inlet flange 52 by means of a closure plate 55. Suitable holes 56 are provided in the inlet flange 52 for connecting it to the ductwork. Preferably, the muffler outlet is closed by a removable outlet cover 57 and as a safety measure the outlet opening therein is covered by a screen 58. Suitable nuts 59 can be welded to the housing for enabling bolted connection of the cover thereto through holes 60 in the cover flanges 61. Four panels or bats 70 of polyfoam material are slid into the annular chamber defined by the housing 50 and the posts 53, the panels 70 seating on the closure plate 55.

While the invention has been described with reference to a certain embodiment, it is to be considered illustrative rather than limiting, and it is intended to cover all further embodiments that fall within the spirit and scope of the appended claim.

We claim:

1. In a farinaceous product suction transfer apparatus, moving means for moving the products; suction means movable in a path above said moving means for engaging the products to accomplish relative withdrawal movement between the products and said moving means; an exhaust fan; upstream duct means connecting the inlet of said exhaust fan with said suction means for producing a product lifting force at said suction means; said upstream duct means including an expansion type solids separator for removing solid material from the gaseous fluid stream; downstream duct means connected to the outlet of said exhaust fan including a sound muffler, said sound muffler having a flow path therethrough with its inner face substantially entirely formed of non-metallic sound reducing material, said sound muffler comprising an outer housing with an inner lining defining an uninterrupted inline flow path therethrough, said inner lining defining the walls of said flow path substantially throughout the entire inner face thereof and being formed entirely of a homogeneous polyfoam material capable of reducing sound, said housing including a rectangular inlet flange extending downstream defining an inlet, corner posts extending downstream from the corners of said inlet, a removable outlet cover having a central rectangular outlet formed therein seated adjacent the upstream ends of said posts, and panels of polyfoam material extending within said housing from said rectangular inlet to said rectangular outlet and filling the annular space defined by said outer housing and said posts.

References Cited

UNITED STATES PATENTS

| | | | |
|---|---|---|---|
| 2,989,855 | 6/1961 | Thompson | 181 |
| 3,066,812 | 12/1962 | Stadelman | 214—309 |
| 3,279,634 | 11/1966 | Temple | 214—309 |

GERALD M. FORLENZA, *Primary Examiner.*

GEORGE F. ABRAHAM, *Assistant Examiner.*

U.S. Cl. X.R.

181—42